Figure 1:
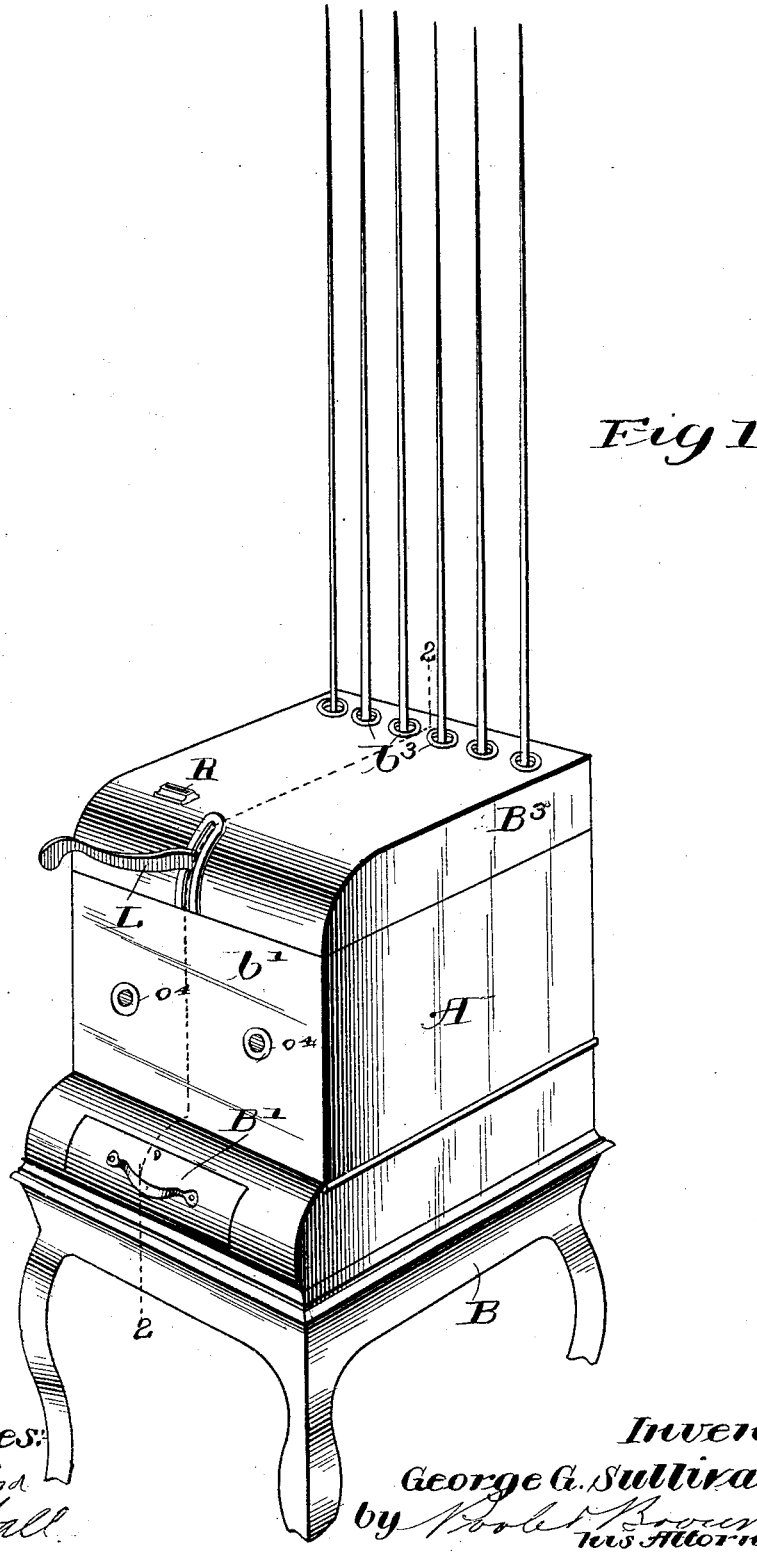

No. 762,602. PATENTED JUNE 14, 1904.
G. G. SULLIVAN.
VENDING MACHINE.
APPLICATION FILED AUG. 17, 1903.
NO MODEL. 6 SHEETS—SHEET 1.

No. 762,602. PATENTED JUNE 14, 1904.
G. G. SULLIVAN.
VENDING MACHINE.
APPLICATION FILED AUG. 17, 1903.
NO MODEL. 6 SHEETS—SHEET 2.

No. 762,602. PATENTED JUNE 14, 1904.
G. G. SULLIVAN.
VENDING MACHINE.
APPLICATION FILED AUG. 17, 1903.
NO MODEL. 6 SHEETS—SHEET 4.

Witnesses:-
Carl S. Crawford
N. H. Hall

Inventor:-
George G. Sullivan
by Robert Brown
his Attorneys

No. 762,602. PATENTED JUNE 14, 1904.
G. G. SULLIVAN.
VENDING MACHINE.
APPLICATION FILED AUG. 17, 1903.
NO MODEL. 6 SHEETS—SHEET 5.
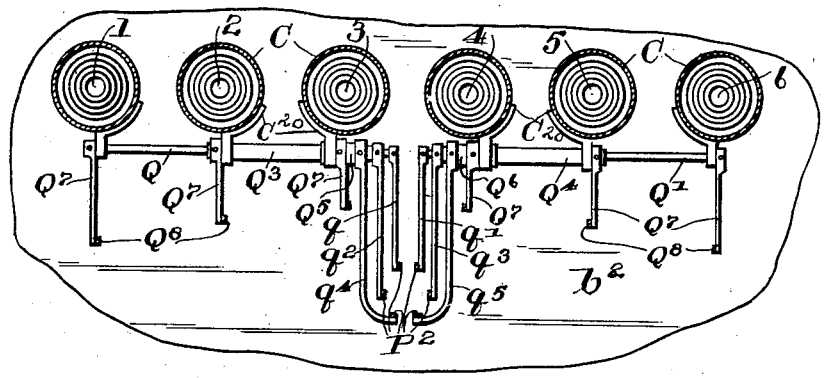
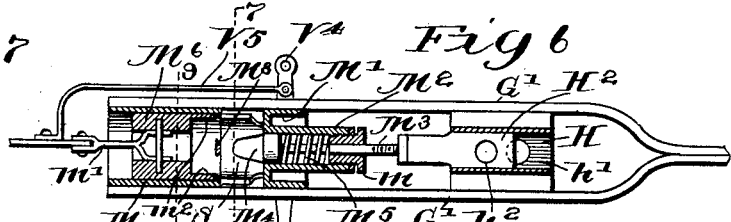
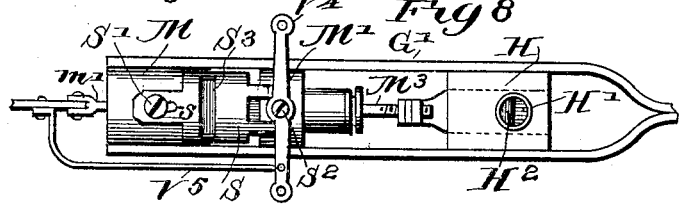
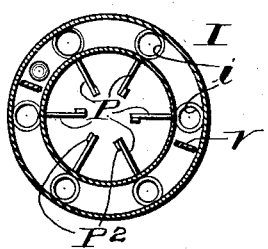
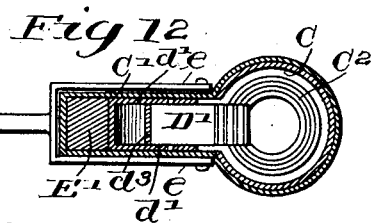
Witnesses:-
Carl H Crawford
W. L. Hall
Inventor:-
George G. Sullivan
by Robert Brown
his Attorneys No. 762,602. PATENTED JUNE 14, 1904.
G. G. SULLIVAN.
VENDING MACHINE.
APPLICATION FILED AUG. 17, 1903.
NO MODEL. 6 SHEETS—SHEET 6.
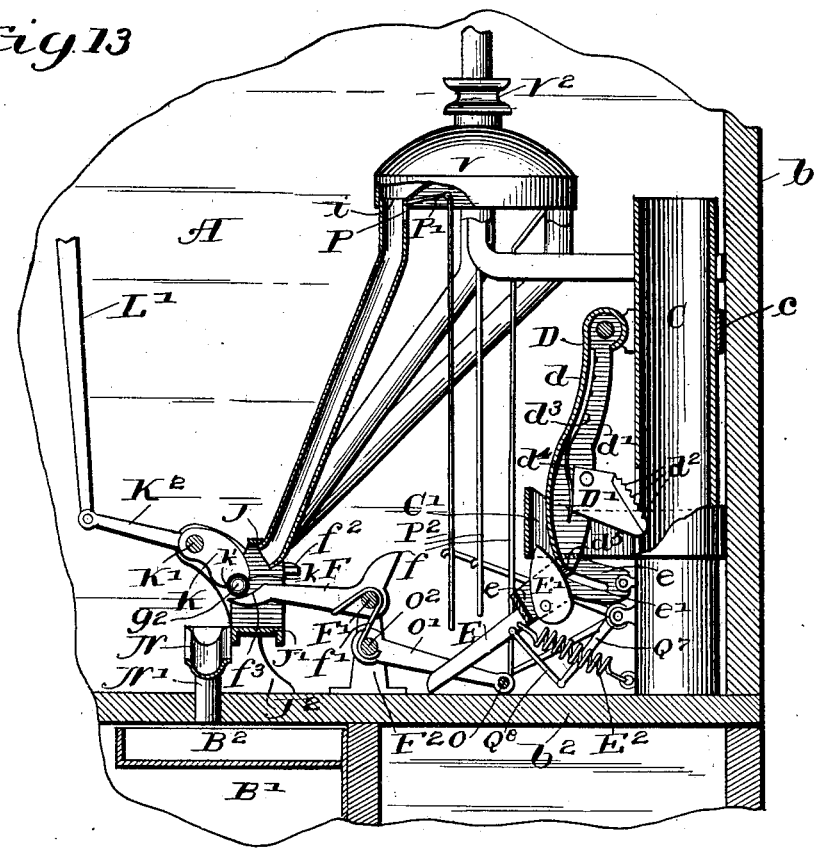
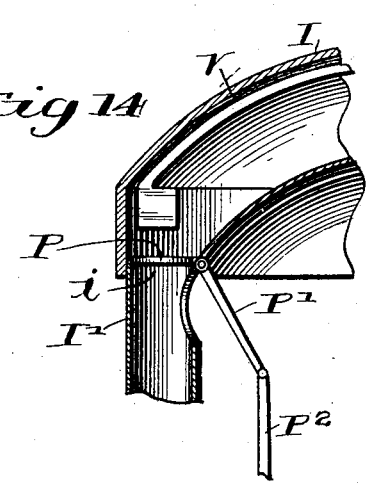
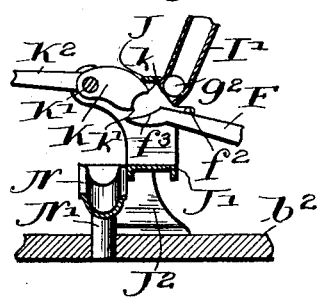
Witnesses:
Carl H. Crawford
W. L. Hall
Inventor
George G. Sullivan
by his Attorneys No. 762,602.

Patented June 14, 1904.

UNITED STATES PATENT OFFICE.

GEORGE G. SULLIVAN, OF MONMOUTH, ILLINOIS.

VENDING-MACHINE.

SPECIFICATION forming part of Letters Patent No. 762,602, dated June 14, 1904.

Application filed August 17, 1903. Serial No. 169,677. (No model.)

*To all whom it may concern:*

Be it known that I, GEORGE G. SULLIVAN, of Monmouth, in the county of Warren and State of Illinois, have invented certain new and useful Improvements in Vending-Machines; and I do hereby declare that the following is a full, clear, and exact description thereof, reference being had to the accompanying drawings, and to the letters of reference marked thereon, which form a part of this specification.

This invention relates to improvements in coin-controlled vending apparatus of that class having a plurality of merchandise-holders from which the merchandise is adapted to be separately released through the operation of a suitable coin-controlled mechanism which is actuated by the insertion of a coin therein; and the invention consists in the matters hereinafter set forth, and more particularly pointed out in the appended claims.

The apparatus illustrated in the drawings is designed more particulary for vending buggy-whips, canes, umbrellas, and the like, and for this purpose is provided with a plurality of upwardly-opening holders or sockets in which the merchandise is adapted to be inserted and locked and from which holders or sockets the merchandise is released through the operation of the coin-controlled mechanism. It will be obvious, however, from the following description that an apparatus embodying the essential features of my invention may be employed for vending other articles of merchandise than those mentioned.

The organized machine herein illustrated, in which my improvements are embodied, embraces, in general terms, a plurality of holders or sockets adapted to receive the separate articles of merchandise, locking devices for locking said articles in said holders or sockets, mechanism for separately releasing said holder-locking devices, a coin-chute, and means operated when a coin is inserted into the apparatus for separately actuating said releasing mechanism to in turn separately release their associated locking devices, and thereby release the articles of merchandise from the holders. In the particular construction herein shown the coin-controlled mechanism operates to separately and successively distribute a plurality of weights to the several releasing mechanisms, and the parts are so arranged that when a weight is delivered to one of the releasing mechanisms it acts thereon in such manner as to release the locking device associated with such mechanism. With this brief outline of the essential elements of the machine herein illustrated I will proceed to a detailed description thereof, reference being had to the accompanying drawings, forming a part of the application.

Figure 2:
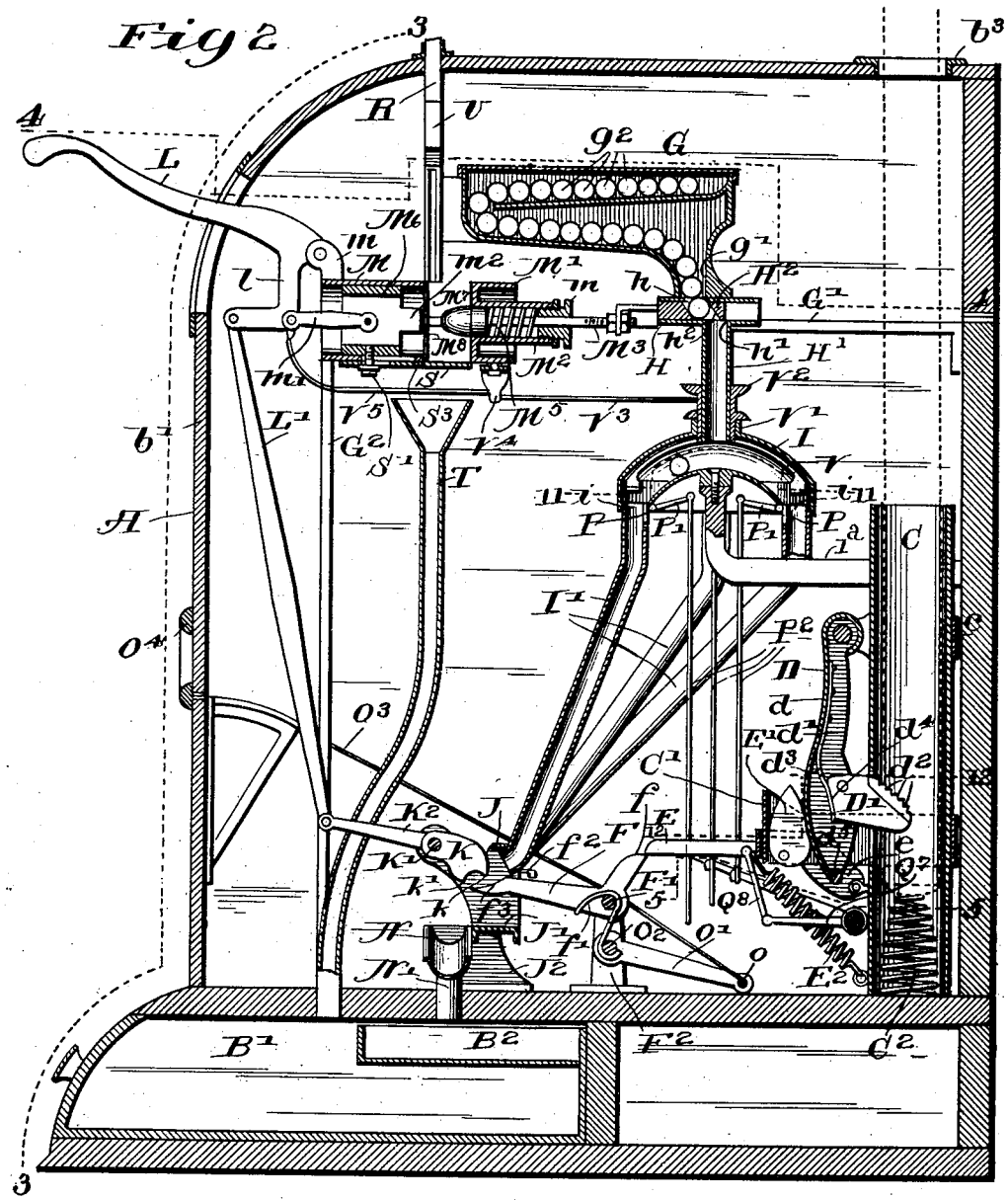
Figure 3:
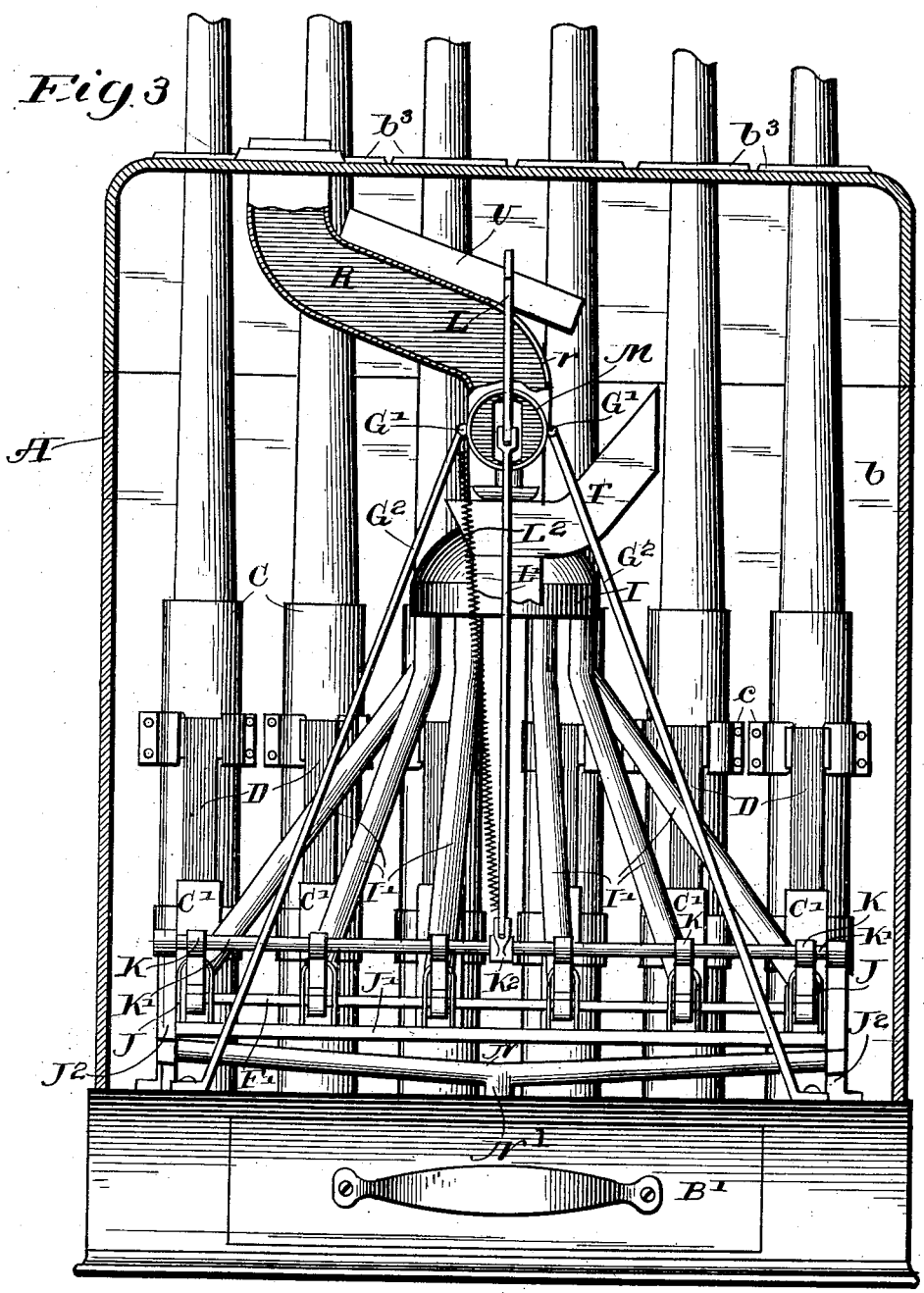
Figure 4:
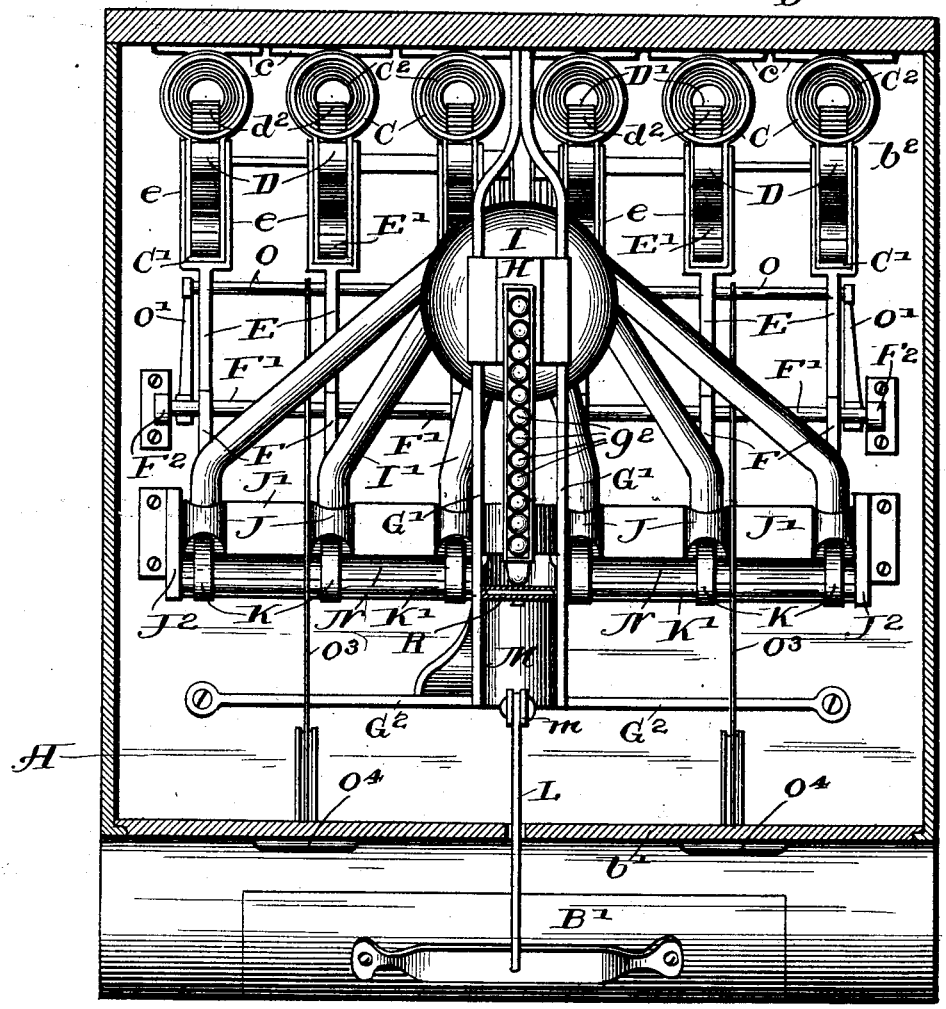

In said drawings, Figure 1 is a perspective exterior view of an apparatus embodying my invention. Fig. 2 is a vertical section of said apparatus, taken on line 2 2 of Fig. 1. Fig. 3 is a vertical section taken on the indirect line 3 3 of Fig. 2 with parts broken away. Fig. 4 is a horizontal section taken on the indirect line 4 4 of Fig. 2. Fig. 5 is a view illustrating parts of the mechanism for closing the openings in the distributing or selecting chamber between said chamber and passages connecting the same with the locking-device-releasing mechanisms, said view being taken on line 5 5 of Fig. 2. Fig. 6 is a horizontal section of the coin-controlled mechanism. Fig. 7 is a cross-section thereof, taken on line 7 7 of Fig. 6. Fig. 8 is a bottom plan view of the parts shown in Fig. 6. Fig. 9 is a transverse section taken on line 9 9 of Fig. 6. Fig. 10 is a perspective view of a gate forming part of the coin-controlled mechanism. Fig. 11 is a plan section of the distributing or selecting chamber, showing the bottom thereof and taken on line 11 11 of Fig. 2. Fig. 12 is a transverse section through the holder and locking devices associated therewith, taken on line 12 12 of Fig. 2. Fig. 13 is a sectional view of one of the holders, its locking device, and the releasing mechanism therefor, the parts being shown in a position changed from that shown in Fig. 2. Fig. 14 is an enlarged fragmentary view of the distributing-chamber, one of the passages thereof, and the closure for said passage. Fig. 15 is a fragmentary side elevation of the releasing mechanism, showing the parts in positions changed from that shown in Fig. 2.

As shown in said drawings, A designates a box or inclosure which contains the vending mechanism. Said box is shown as mounted on a suitable support or stand B and is provided with a drawer B', adapted to receive the coins as they drop from the coin-controlled mechanism, and with a compartment B² in said drawer which is adapted to receive weights which control the releasing mechanism. Said box is provided with a cover B³, which is hinged to the upper margin of the rear wall $b$ of the box and is adapted to be detachably secured at its front margin to the front wall $b'$ of the said box. Located within the box just in front of the rear wall thereof is a plurality of merchandise-holders C. Said holders are supported on the bottom wall proper, $b^2$, of the box, are arranged in a row parallel with the rear wall of the box, and are connected at their upper ends with said rear wall by means of metal clasps $c$. In the present instance the machine is designed for vending buggy-whips and like articles, and for this purpose said holders have the form of upwardly-opening sockets, and the cover or top B³ of the box is provided in alinement with the several sockets with openings $b^3$, through which the whips extend when contained within the holders, as clearly indicated in Fig. 1. It will be understood, of course, that in designing the machine for vending other articles of merchandise the holders C will be changed to correspond with the character of such merchandise. Each holder is provided with a device for locking the whip therein. Said locking device is shown more clearly in Figs. 2, 12, and 13 and are each made as follows: D designates a lever located in front of the holder and pivotally connected at its upper end with the holder, so that its lower end swings vertically toward and away from the holder. As herein shown, said lever D is pivoted to the clasp $c$, by which the holder is connected with the rear wall of the casing. Said lever is made hollow, as clearly shown in Figs. 2, 12, and 13, having a central web $d$ and rearwardly-directed side flanges $d'$ $d'$. D' designates a clamp-block, which is pivoted to said lever between the side flanges thereof and extends rearwardly through an opening in the holder a distance into said holder. Said block is provided at its inner end with a curved serrated surface $d^2$, which is adapted to engage the whip in the holder, and preferably said engaging surface of the block consists of a separate yielding part, as rubber, which is attached to the block. $d^3$ designates a spring which is attached to the central web of said lever and bears rearwardly at its lower end against the rear inclined surface $d^4$ of the block below its pivot, so as to normally hold said block projected into the holder in a direction generally at right angles to the axis of the holder. E designates a generally horizontal lever, which is pivoted at its inner end to the holder, said lever being bifurcated and the arms $e$ $e$ thereof extending outside of the lower end of the lever D and being pivotally connected with brackets on said holder in a manner shown in Fig. 12. Said arms $e$ of the lever E are provided with inclined slots $e'$, as shown in Fig. 13, which are engaged by studs $d^5$, projecting laterally from the side flanges of the lever D. Said slots are so disposed that when the forward end of the lever E is swung downwardly the lower end of the lever D is swung outwardly away from the holder, and when the lever E is swung upwardly it serves to swing said lower end of said lever D toward the holder. C' designates a horizontal guide-loop, which is connected with and projects forwardly from the holder around the lower end of the lever D. E' designates a wedge-block, which is located between the fork-arms of the lever E, and is pivoted at its lower end to said arms. The tapered upper end of said block extends upwardly into the loop C' between the closed end of the loop and the vertically-swinging lever D, so that when the forward end of the lever E is raised the wedge acts to force the lower end of the lever D toward the holder and to hold the clamp-block D' in the holder. The outer end of the lever E is normally held depressed through the medium of a spiral contractile spring E², Fig. 2, which is attached at one end to said lever and at its other end to the lower end of the holder, as herein shown, and said lever E is adapted to be held in its uppermost position by means hereinafter to be described. The whip or other article when inserted into the holder acts to swing the clamping-block D' outwardly. Said block acts as a clamp to prevent the withdrawal of the whip so long as the lower end of the lever D is swung rearwardly, which occurs when the forward end of the lever E and the wedge-block occupy their uppermost positions. When said forward end of the lever E is swung downwardly, the wedge E' is retracted and the inclined grooves $e'$ of the lever E act to withdraw or swing outwardly the lower end of the lever D from the holder, and to thereby release the clamp-block D' from the whip, so that the latter may be withdrawn from the holder. Preferably an ejecting device is provided for throwing the whip upwardly past the locking device when released, said ejecting device consisting in the present instance of a spiral expansively-acting spring C², Fig. 2, which is located in the bottom of the holder and which is placed under tension when the whip is inserted thereinto.

As herein shown, six holders are provided; but it will be understood that a greater or less number of holders may be employed and operatively connected with the coin-controlled mechanism hereinafter to be described.

The means for holding the forward ends of the levers E in their uppermost position, and thereby secure or fasten the holder-locking device, consist of detent-levers F, provided with rearwardly-projecting detents $f$, and said levers are pivoted between their ends on a horizontal shaft $F'$, which extends transversely across the machine from one end thereof to the other and supported on the upper ends of short standards or stanchions $F^2$. The detent-lever F associated with each lever E is located in the same plane with said levers E, and when said lever E is in its upper position the forward end thereof rests on the tip of the detent $f$ of said lever F. The lever F is provided with a spring $f'$, Fig. 2, which normally holds said lever pressed upwardly against a stop $f^2$, formed on or attached to an adjacent stationary part of the apparatus. In setting each lever E the same is pulled upwardly past the detent $f$ of the associated lever F, said detent yielding upwardly against the action of its spring $f'$, and when said lever E is moved above the detent the spring acts to restore the lever F to its normal position against the stop $f^2$, in which position the detent acts as a stop to hold the forward end of the lever E in its uppermost position. When it is desired to release the locking device of the holder, the forward end of the detent-lever F is depressed sufficiently to release the detent from the lever E. The mechanism for effecting this result is made as follows: G designates a weight or ball holding chamber which is located near the upper end of the block and is supported on a horizontal frame consisting of two rods $G'$ $G'$, which are supported at their rear ends on the rear wall of the casing and at their forward ends on oblique standards $G^2$. Said chamber G is provided with a continuous double inclined raceway terminating in a discharge-opening $g'$ and in which raceway is adapted to be contained the weights $g^2$, which have the form of balls. The weights or balls are released from the chamber G through the medium of a suitable valve mechanism, which is operated by the coin-controlled mechanism hereinafter to be described. Said valve mechanism as herein shown is made as follows: The discharge mouth or nozzle of said chamber G is located directly over an opening $h$ in a casing H, located below said chamber. Said casing H is provided out of line with said opening $h$ and in the lower wall thereof with another opening $h'$, which communicates with a vertical pipe or passage $H'$, which latter discharges into a distributing-chamber I, supported on a bracket $I^a$, attached to the rear wall of the casing. Contained within the casing H below said ball-chamber is a perforated slide or valve $H^2$, having an oblique through-opening $h^2$, which is adapted when at one limit of its movement to register with the discharge-opening $g'$ of the chamber G and when located at the other limit of its movement to register with the opening $h'$ at the lower end of said casing H. Said slide is connected with the coin-controlled mechanism hereinafter to be described. When the slide is in its forwardmost position, the opening thereof is in position to receive one of the balls $g^2$ of the chamber G, and upon the actuation of said coin-controlled mechanism said slide is thrust rearwardly to bring the opening therein over the passage $h'$ and deposit the ball carried thereby through said passage into the distributing-chamber I. Said distributing-chamber I is provided in its bottom with a plurality of discharge-openings $i$, which communicate with passages or pipes $I'$ equal in number to the number of holders C. The bottom wall of the chamber is centrally convex for the purpose of directing the balls to the openings $i$, which are disposed concentrically in the bottom thereof near its circumference. The pipes or passages $I'$ lead downwardly from the distributing-chamber and terminate at their lower ends closely adjacent to the outer or free end of the detent-levers F, heretofore mentioned. Said pipes $I'$ are shown as terminating at their lower ends in inclosures J, having top, bottom, and two vertical walls and open at their front and rear sides. The forward end of each lever F extends into the adjacent or associated inclosure J. Said inclosures J are supported on a transverse horizontal bar $J'$, (shown in Fig. 3), which bar is supported at its end on short vertical standards $J^2$. Projecting into the forward open side of each of the inclosures J and in line with the associated detent-lever F is a rock-arm K, all of said rock-arms being rigidly secured to a rock-shaft $K'$, which is journaled at its end in the standard $J^2$, to which reference has been made. The free ends of said detent-levers F are located in position to receive a ball discharged from the adjacent pipe or passage $I'$, and said free end of the detent-lever is made concave on its upper side, as indicated at $f^3$, Fig. 2, to conform to the shape of said ball. The rock-arms K are each provided on its forward end with two projections $k$ $k'$, which are separated a short distance and between which the end face of the arm is curved to conform to the shape of the balls $g^2$. In Fig. 2 is shown the normal position of the rock-arms K. Said rock-arms are adapted to be swung upwardly at their free ends at or before the time a ball is released into the distributing-chamber in the position shown in Fig. 15, and when in this position a ball or weight may pass between either of the rock-arms and its associated detent-lever, the projection $k$ of the lever being lifted sufficiently to permit the ball or weight to pass between the same and the lever. It will be understood that all of the rock-arms are swung upwardly simultaneously, but as there is only one ball released in each operation of the machine but one rock-arm and its associated detent-lever will receive between the same a ball. When said rock-arms are again swung downwardly, said interposed ball serves as a means for transmitting the said downward movement of one of the rock-arms to its associated detent-lever, whereby the forward end of said detent-lever is swung downwardly and the rear end thereof upwardly in a manner to free the same from the lever E, thereby releasing the locking device associated with said lever and unlocking the article from the holder with which said locking device is connected. The means for swinging the rock-arm K in the manner described consists of a hand-lever L, which is pivoted at its inner end to a lug $m$ of a cylindric casing M (forming part of the coin-controlled mechanism hereinafter to be described) and a link L', which is pivoted at its upper end to an arm or extension $l$ of said lever and at its lower end to an arm $K^2$, which is rigid with the rock-shaft K'. Said hand-lever L projects outwardly through a slot in the front wall of the case or box B, and when said hand-lever is thrown downwardly the rock-arms K are swung upwardly into the position shown in Fig. 15. The parts are restored to their normal positions when the lever is released, by means of a spiral contractile spring $L^2$, connected at its lower end with the arm $K^2$ and at its upper end with said cylindric casing M, as shown in Fig. 3, and said spring is made sufficiently strong to operate the releasing devices in the manner hereinbefore described. A double inclined trough N, Fig. 3, is located below the rock-arms K in position to receive the balls $g^2$ as the latter drop out of engagement with said arms and the detent-levers. The two inclined parts of said troughs are directed inwardly and communicate with a central pipe or tube N', which discharges into the inclosures $B^2$ of the drawer B', before referred to. Said inclined trough is supported on the upright standards $J^2$.

Means are provided for setting the levers E on the detents $f$ of the detent-levers F after said lock-levers have been released. When the locks have been released, the levers E occupy the positions shown in Fig. 13—that is to say, with their forward ends inclined downwardly and resting on the bottom walls $b^2$ of the casing. The means for setting the said levers consists of two shafts O, which are located transversely beneath said levers, one at each side of the machine and in alinement with each other. Said shafts are attached at their ends to forwardly-directed upwardly-inclined links O', which latter are pivoted at their forward ends to a stationary shaft $O^2$ extending transversely across the machine and mounted in the standards $F^2$ beneath the shaft F', on which the detent-levers are mounted, as shown in Fig. 2. The links O' are adapted to be swung upwardly about the shaft $O^2$ as a center, and when swung upwardly are brought into contact with said levers E and carry said levers upwardly into locking engagement with the detents $f$ of the levers F. The lifting-bars O are raised, as herein shown, through the medium of flexible strands $O^3$, which are attached to said bars and extend forwardly through suitable openings in the front wall of the casing and are provided at their ends outside of said casing with buttons $O^4$, which may be grasped by the fingers to pull said straps outwardly. Gravity may be depended upon to restore said lifting-bars to their lowermost positions, or, if found necessary, restoring-springs may be employed for this purpose. The construction described enables one or all of the levers to be lifted, as conditions may require. Two bars O are provided, for the reason that the construction of the apparatus shown is such as to prevent a single bar extending continuously across the apparatus.

When all of the holders of the apparatus are filled and the locking devices set, as shown in Fig. 2, all of the pipes I' are in open communication with the distributing-chamber I, so that when a ball $g^2$ is delivered to said chamber it rolls by gravity into one of said pipes I' and therethrough to the releasing mechanism of one of the locking devices. No means are herein shown for controlling the movement of said balls to either one of the pipes I', but said ball passes into that one of the pipes which it may chance to enter. After said ball has passed into and through the pipe and has actuated the releasing mechanism associated with one of the locking devices it is necessary to close that passage in order that a ball will not again pass through said pipe or passage until another article has been inserted into the holder associated therewith. Means are provided for closing each of said passages, which means are operated when the locking device associated with said pipe is released, said means being made as follows: Each of said passages is provided at the receiving end thereof adjacent to the distributing-chamber with a closure consisting of a plate P, (shown more clearly in Figs. 2 and 14,) which is made of a size to close said opening and is adapted to be swung across the opening when the locking device associated with the pipe in which said closure is located is released. Said closure or plate P is attached to an arm P', which is pivoted in the wall of the passage or pipe I' adjacent to the distributing-chamber. The closure or plate P of each pipe when in its open position occupies a substantially vertical position in line with the wall of the pipe, and said wall of the pipe is provided with an opening to accommodate said plate when in this position. The plate when closed occupies a substantially horizontal position, as shown in full lines in Fig. 14, and is located at this time in the plane of the bottom of the chamber. The means for swinging said plates or closures to open and close the same are made as follows: Associated with the locking devices of each of said holders is a rock-shaft, and said rock-shafts have bearing in brackets $C^{20}$, affixed to said holders, as shown in Fig. 5. Six holders are herein shown, three on each side of the machine, and the rock-shafts constituting parts of the devices for actuating said closures are arranged in two groups, one group for each of the three holders of the two sets, and for sake of compactness said rock-shafts of each group are arranged in telescoping relation, as shown in said Fig. 5. The holders on the right-hand side of the machine are designated by the numerals 1, 2, and 3, while those on the left-hand side of the machine are designated by 4, 5, and 6. The rock-shafts Q Q' for holders No. 1 and No. 6, respectively, extend from said holders to the space between holders No. 3 and No. 4 or between the two sets of holders. The rock-shafts $Q^3 Q^4$, associated with the holders No. 2 and No. 5, respectively, surround said rock-shafts Q Q', respectively, and extend from the holders No. 2 and No. 5 to said space between the holders No. 3 and No. 4. The rock-shafts $Q^5 Q^6$ for the holders No. 3 and No. 4 consist of short tubes which surround the inner ends of the rock-shafts $Q^3$ and $Q^4$. The bearings for the inner ends of the shafts Q Q' are formed by the hollow shafts $Q^3 Q^4$, while the bearings for the latter shafts are formed by the shafts $Q^5 Q^6$. Said rock-shafts Q to $Q^6$, respectively, are provided at their inner ends with rigid arms $q\ q'\ q^2\ q^3\ q^4\ q^5$, which extend forwardly from the inner ends of said rock-shafts beneath the distributing-chamber I and are connected at their forward ends with the lower ends of vertical links $P^2$, which latter are pivoted at their upper ends to the inner ends of the rigid arms P', connected with the plates or closures P, as clearly shown in Fig. 2. The outer ends of each of said rock-shafts are provided with a lever $Q^7$, which is connected, by means of a link $Q^8$, with the lever E of the adjacent locking device of the associated holder, each of said levers $Q^7$ being connected with one of the levers E of one of the locking devices. With this construction it will be seen that when each of the levers E is swung downwardly in releasing the locking device associated therewith the associated levers $Q^7$ will also be swung downwardly and will act on the rock-shaft to which it is attached to draw downwardly the link $P^2$ connected therewith, and thereby swing the plate or closure connected with said link in position to close the passage in which said closure is located.

Referring now to the construction of the coin-controlled mechanism by which the parts hereinbefore described are operated, said mechanism is made as follows: Said coin-controlled mechanism is located in front of and below the chamber G and embraces as a part thereof the cylindric casing M, before referred to. Said casing is attached to the forward ends of the arms G' G' of the frame which supports the said chamber, as clearly shown in Figs. 4, 6, and 7. Located in rear of and in alinement with said cylindric casing is a short cylindric body M', which is supported between said arms G' G'. Said parts M and M' are separated a distance, and the space $M^7$ between the same constitutes the space into which the coin is deposited, the coin being delivered to said space through the medium of a coin-chute R, which extends upwardly through a suitable opening in the casing-cover in position to receive a coin from outside the casing. Said coin-chute is shown as attached to the ball-chamber G. Said part M' is provided centrally thereof with a sleeve or tube $M^2$, which is open at both ends, and within said sleeve is contained a sliding rod $M^3$, which is provided at its forward end with an enlargement or head $M^4$. Said head has close sliding engagement with the forward end of the sleeve $M^2$ and projects a distance forwardly of said cylindric part M' and centrally into the space $M^7$ between said part and the casing M. Said sliding rod $M^3$ is connected at its rearward end with the slide or valve $H^2$, which delivers the balls from the ball-chamber G to the passage H', communicating with the distributing-chamber. Said rod $M^3$ passes through a hollow exteriorly-screw-threaded nut $m$, which has screw-threaded engagement with the rear end of the sleeve $M^2$, and interposed between said nut and the enlargement or head $M^4$ of said rod is a spiral expansively-acting spring $M^5$, which acts to hold the bolt in its forwardmost position. The screw-threaded connection of said nut $m$ with the sleeve enables the tension of said spring to be varied as desired. Contained within the cylindric casing M is a plunger $M^6$, which is connected by a pitman $m'$ with the arm L' of the hand-lever L, whereby when said lever is depressed the plunger is moved inwardly or rearwardly in said casing. The plunger $M^6$ is provided on its side margins with oppositely-located rearwardly-directed lugs or extensions $m^2$, which are located laterally out of alinement with the centrally-located head of the sliding bolt $M^3$. Said lugs or projections of the plunger when the plunger is in its retracted position are located wholly within the rear end of the cylindric sleeve M. When a coin is inserted between the plunger and sliding bolt and the plunger thrust or moved forwardly, it is engaged at its margin by said lugs or extensions $m^2$ of the plunger and at its central portion with the enlargement or head $M^4$ of the sliding bolt $M^3$, so that said coin constitutes a bridge or connecting means which transmits movement from said plunger to the bolt and to thereby move the slide $H^2$ in position to deliver a ball from the ball-chamber G to the distributing or selecting chamber I.

Located below the cylindric casing M and the part M' and extending across the space $M^7$ between said parts is a sliding gate S, which is curved in cross-section to conform to the exterior surfaces of said parts. Said plate is connected by a screw S' with the cylindric casing. The screw extends through a slot *s* in the gate, whereby the plunger has movement independently of the gate, and extends also through a slot in the casing to permit the necessary longitudinal movement of the plunger in the casing. Said gate is provided at its rear end with an open slot, which has guiding engagement with a screw-stud $S^2$ in the lower part of the cylindric part M'. The gate is provided between its ends with a transverse coin-releasing slot $S^3$, which is adapted by movement of the gate to be brought under the coin-receiving space $M^7$. When the plunger is in its retracted position, which retractive movement is effected by the spring $L^2$, the gate occupies a position with its slot $S^3$ out of line with or in front of the coin-receiving space $M^7$, and the imperforate part of the gate serves to arrest the coin in said space $M^7$ and prevent said coin dropping through said space. The forward end of the hollow casing M is provided with a vertical bar $M^8$, which acts to prevent the coin turning in said space. When the coin is introduced in said space $M^7$ and the plunger thrust inwardly or rearwardly, it is engaged at its margins by the lugs $m^2$ of the plunger and at its center by the head $M^4$ of the sliding rod and transmits the motion of the plunger to the sliding rod $M^3$, as before stated. When the plunger has moved a short distance forwardly, the screw S' is brought into contact with the inner end of the slot *s* of the gate S, so that in the latter part of the movement of the plunger the gate is moved inwardly to bring the coin-releasing slot $S^3$ thereof in line with the space $M^7$. Owing to the slotted connection of the gate with the plunger said plunger is permitted to be retracted sufficiently under the influence of the spring $L^2$ to release the coin from the lugs $m^2$ and head $M^4$ of the sliding bolt before the gate is moved rearwardly. When said coin is released, therefore, it drops from the space $M^7$ through the slot $S^3$ in the gate. The coin is discharged from the coin-controlled mechanism through a spout or chute T into the drawer B' in the bottom of the case, as shown in Fig. 2, the receiving end of the spout being located beneath said space $M^7$. The lower end of the coin-chute R is formed to partially inclose the space $M^7$, said lower end constituting the side walls of said space, as clearly shown in Fig. 3. One side of the coin-chute is provided with a slot *r*, as more clearly shown in Fig. 3, and a magnet U is attached to said chute above said slot. The purpose of this construction is to withdraw magnetic disks from the chute and not permit the same to enter the space $M^7$ of the coin-controlled mechanism in case an attempt be made to operate the mechanism with such spurious token. In case an attempt be made to operate the mechanism by the use of a lead or other soft-metal disk said disk will be distorted by the pressure exerted upon its center and margins and will not permit the valve or slide H' to be advanced sufficiently to release a ball into the distributing-chamber, wherefore no operation of the apparatus will take place.

In order to insure that the balls $g^2$ be directed to the open pipes I' when one or more of said pipes are closed, a rotary agitator V is located in the distributing-chamber, as shown in Fig. 2. Said agitator is affixed to a short sleeve V', which extends upwardly through the upper wall of the distributing-chamber around the pipe H' and is provided at its upper end with a pulley $V^2$. $V^3$ designates a cable which is trained about said pulley, and the ends thereof are attached to the opposite ends of an oscillatory lever $V^4$, which is pivoted between its ends upon the screw-stud $S^2$ below the cylindric part M'. Said lever is oscillated through the medium of links $V^5$, which are pivoted at their rear ends to the lever $V^4$ and at their forward ends to the arm *l* of the hand-lever L. With this construction the agitator is rotated in each operation of the apparatus and each time a ball is delivered to the distributing-chamber.

The operation of the apparatus will be obvious from the foregoing, but may be briefly recapitulated, as follows: The whips or other articles may be inserted in the holders either before or after the locking devices are secured or fastened. When said whips are in place in the holders and locked therein, the levers E are all in the positions shown in Fig. 2. When it is desired to release one of the whips, a coin is inserted into the space $M^7$ of the coin-controlled mechanism and the hand-lever L depressed. The slide or valve is thereby operated to release one of the balls into the distributing-chamber, and said ball passes through one of the pipes I' to the space between the rock-arm K and detent-levers F of one of the releasing devices. While the hand-lever is depressed, the rock-arms are swung upwardly, so as to permit said ball to pass between one of said rock-arms and its associated detent-lever. The handle should be held depressed long enough to permit the ball to enter said releasing mechanism, so that when the hand-lever is restored by its spring $L^2$ the ball will be in position to transmit motion from the rock-arm of said releasing device to the adjacent detent-lever F and act therethrough to release the locking mechanism associated therewith. In case the parts be restored before the ball reaches the releasing mechanism, however, and the apparatus thereby fails to operate, the rock-arms may be again swung upwardly by depression of the hand-lever L and permit said ball to assume its proper operative position with respect to the rock-arm and detent-lever, and thereby actuate said releasing mechanism.

It is obvious that many changes may be made in the structural details illustrated without departing from the spirit of my invention, and I do not wish to be limited to such details, excepting as hereinafter made the subject of specific claims. For instance, it is obvious that the initially-actuated part need not, so far as the operation of the locking and releasing mechanism is concerned, be a coin-controlled mechanism.

I claim as my invention—

1. A vending apparatus comprising a plurality of merchandise-holders, means for retaining the articles in said holders, and releasing mechanisms severally associated with said retaining means, said retaining means each comprising a lever which swings toward and from the holder, a clamping-block pivoted to said lever and extending into the holder, means for locking said lever with its inner end adjacent to said holder, said means being operatively connected with the associated releasing mechanism, whereby said retaining means may be operated to release the article from the holder.

2. A vending apparatus comprising a plurality of merchandise-holders, means for locking the articles in said holders, and releasing mechanisms severally associated with said retaining means, said retaining means consisting each of a lever pivoted to swing toward and from the holder, a clamp-block pivoted to said lever and extending into the holder, a lever pivoted to said holder and connected with said first-mentioned lever, whereby, when said second lever is swung downwardly, the first lever is swung away from the holder and vice versa, said second lever being operatively connected with the releasing mechanism.

3. A vending apparatus comprising a plurality of merchandise-holders, means for retaining the articles therein and releasing mechanisms severally associated with said retaining means, said retaining means each comprising a lever pivoted to swing toward and away from the holder, a clamp-block pivoted to said lever and extending into the holder, a second lever pivoted to the holder and connected with the first lever whereby the latter is swung away from the holder when the second lever is depressed, and vice versa, and a wedge or the like interposed between said first-mentioned lever and a part stationary with the holder for holding said first-mentioned lever in its locking position when the second lever is raised, said second lever being operatively connected with the releasing mechanism.

4. A vending apparatus comprising a plurality of merchandise-holders, means for retaining the articles in said holders, and releasing mechanisms severally associated with said retaining means, said retaining means each comprising a lever pivoted to swing toward and away from the holder, a spring-pressed clamp-block pivoted to said lever and extending into the holder and provided at its inner end with a yielding contact-face, a second lever pivoted to the holder and provided with fork-arms which pass on the sides of the first-mentioned lever, said first lever and the arms of the second lever having interlocking connections, whereby the latter lever will be swung away from the holder when said second lever is depressed and vice versa, and a wedge pivoted to said second lever and adapted to be thrust between said first lever and a loop inclosing said second lever to hold said first lever in its closed position when the second lever is elevated, said second lever being operatively connected with the releasing mechanism.

5. A vending apparatus comprising a plurality of merchandise-holders, means for retaining the articles in said holders, a plurality of releasing mechanisms severally associated with said retaining means, said releasing mechanisms embracing a plurality of pivoted detent-levers and the retaining devices embracing a plurality of spring-pressed levers adapted for interlocking engagement with the detent-levers and a restoring-bar extending transversely beneath said levers of the retaining devices for restoring the same into locking relation with said detent-levers when said retaining devices are released.

6. A vending apparatus comprising a plurality of merchandise-holders, means for retaining the articles in said holders, a plurality of releasing mechanisms severally associated with said retaining means, said releasing mechanisms comprising a plurality of pivoted detent-levers and the retaining devices comprising a plurality of spring-pressed levers adapted for interlocking engagement with the detent-levers, a restoring-bar extending transversely beneath said levers of the retaining devices for restoring the same into locking relation with said detent-levers when said retaining devices are released, and flexible strands connected with said lifting-bar and provided outside of the apparatus with finger-pieces.

7. A vending apparatus comprising a plurality of merchandise-holders, means for retaining the articles therein, a plurality of releasing mechanisms severally associated with said retaining devices, said retaining devices comprising each a forwardly-directed lever, and the releasing mechanisms comprising detent-levers adapted for interlocking engagement with said retaining-levers to hold the same in their elevated positions, springs applied to said retaining-levers for releasing said locking mechanisms when the detent-levers are disconnected therefrom, and a lifting-bar extending transversely beneath said retaining-levers for lifting said levers into engagement with the detent-levers.

8. In a machine for the purpose set forth the combination with a socket or holder open at its end, a lever pivoted to swing toward and away from said holder, a yielding clamp-block pivoted to said lever and extending into the holder, and a second lever operatively connected with the first lever to move the same toward and from the holder.

9. In a machine for the purpose set forth the combination with a socket or holder, a lever pivoted to swing toward and away from said holder, a yielding clamp-block pivoted to said lever and extending into the holder, a second lever operatively connected with the first lever to move the same toward and from the holder, and an ejecting device located in the bottom of said socket for throwing the articles past said clamping-block.

10. In a vending-machine, the combination with a holder having an open upper end through which the article to be vended is thrust, means for locking the article in said holder, and an ejecting device in the lower end of the holder for throwing the article upwardly past the locking device when the article is released.

11. In a vending-machine, the combination with a closed casing, a plurality of upwardly-opening holders therein, the top wall of the casing being provided in line with the holders with a plurality of openings through which the articles are thrust into the holders, devices for locking said articles in the holders, and means for successively releasing said locking devices.

12. A vending apparatus comprising a plurality of merchandise-holders, means for retaining the articles therein comprising clamping-blocks which project into the holders to engage said articles, a single initially-actuating part, and a plurality of controlling devices adapted to be successively brought into action by said initially-actuating part to release said retaining means.

13. A vending-machine comprising a plurality of merchandise-holders, means for retaining the articles therein, a single initially-actuating part, a plurality of controlling devices adapted to be successively brought into action by said initially-actuating part to release said retaining means, and ejector devices in said holders for ejecting the articles when released from the retaining device.

14. A vending-machine comprising a plurality of merchandise-holders, means for retaining the articles therein, comprising clamping means adapted to engage said articles, a single initially-actuating part, a plurality of controlling devices adapted to be successively brought into action by said initially-actuating part to release said retaining means, and ejector devices in said holders for ejecting the articles when released from the retaining devices.

In testimony that I claim the foregoing as my invention I affix my signature, in presence of two witnesses, this 5th day of June, A. D. 1903.

GEO. G. SULLIVAN.

Witnesses:
S. M. BEECHER,
CHAS. WILLIAMSON.